(12) United States Patent
Deshpande et al.

(10) Patent No.: US 8,211,387 B2
(45) Date of Patent: Jul. 3, 2012

(54) ANODE TAILGAS OXIDIZER

(75) Inventors: Vijay Anant Deshpande, Houston, TX (US); Curtis L. Krause, Houston, TX (US); Paul Francis Martin, Toronto (CA); Kevin Hoa Nguyen, Missouri City, TX (US); James F. Stevens, Katy, TX (US); William Spencer Wheat, Missouri City, TX (US)

(73) Assignee: Texaco Inc., San Ramon, CA (US)

( * ) Notice: Subject to any disclaimer, the term of this patent is extended or adjusted under 35 U.S.C. 154(b) by 836 days.

(21) Appl. No.: 11/487,731

(22) Filed: Jul. 17, 2006

(65) Prior Publication Data
US 2006/0257302 A1   Nov. 16, 2006

Related U.S. Application Data

(62) Division of application No. 10/407,290, filed on Apr. 4, 2003, now Pat. No. 7,101,175.

(51) Int. Cl.
*B01J 10/00* (2006.01)
*B01J 8/04* (2006.01)

(52) U.S. Cl. ........ 422/643; 422/171; 422/173; 422/179; 422/621; 422/633; 422/635; 422/649; 432/29; 432/30; 432/18; 431/170; 431/207; 431/258; 431/346; 431/326; 431/328; 165/163; 165/145; 165/288; 122/4 D

(58) Field of Classification Search .......... 422/197–200; 429/19, 20; 432/29, 30; 431/258; 165/164, 165/145, 288
See application file for complete search history.

(56) References Cited

U.S. PATENT DOCUMENTS 1,388,355 A * 8/1921 Mathy ............................ 431/170
2,976,853 A * 3/1961 Hunter et al. .................. 122/4 D
3,218,249 A * 11/1965 Ballard et al. ................. 208/108
(Continued)

FOREIGN PATENT DOCUMENTS
EP   0 913 357 A1   5/1999
(Continued)

*Primary Examiner* — Kaity V. Handal
(74) *Attorney, Agent, or Firm* — Melissa Patangia; Christopher D. Northcutt

(57) ABSTRACT

A combustor for oxidizing a combustion fuel and pre-heating one or more reactants for fuel reforming. The combustor includes an elongated housing having an inlet for receiving a combustion fuel and an outlet for exhausting combustion products. The elongated housing further includes a cylindrical side wall, a bottom wall, and a top wall. Inert particles are disposed within the housing adjacent the inlet. A combustion catalyst bed is disposed within the housing above the inert particles that is a mixture of inert particles and combustion catalyst. The inert particles and the combustion catalyst preferably have a volumetric ratio of inert particles to catalyst between about 2:1 and about 4:1. The combustor has at least one heat exchanger within the combustion catalyst bed for heating a reformer reactant and generating steam. Preferably, the combustor includes at least two heat exchangers within the combustion catalyst bed, the heat exchanging elements have different surface areas. The combustor can include at least one sensor for measuring temperature within the combustor, and preferably the reactor includes two or more sensors for measuring temperature at two or more locations within the combustion catalyst bed. A power-generating apparatus comprising the combustor, a fuel processor and fuel cell is also provided. Methods for pre-heating a reactant and generating steam for use in a fuel reformer and for manufacturing a combustor for use in fuel reforming are provided.

18 Claims, 2 Drawing Sheets

U.S. PATENT DOCUMENTS

| | | | |
|---|---|---|---|
| 3,270,798 A * | 9/1966 | Ruff | 431/329 |
| 4,171,947 A * | 10/1979 | Rice | 431/328 |
| 4,400,356 A * | 8/1983 | McVay et al. | 422/171 |
| 4,483,673 A * | 11/1984 | Murai et al. | 431/328 |
| 4,522,894 A | 6/1985 | Hwang et al. | |
| 4,946,667 A | 8/1990 | Beshty | |
| 5,360,603 A * | 11/1994 | Drnevich et al. | 423/403 |
| 5,458,857 A | 10/1995 | Collins et al. | |
| 5,476,375 A * | 12/1995 | Khinkis et al. | 431/7 |
| 5,522,723 A * | 6/1996 | Durst et al. | 431/328 |
| 5,552,360 A * | 9/1996 | Farrauto et al. | 502/178 |
| 6,071,116 A | 6/2000 | Philippe et al. | |
| 6,077,620 A * | 6/2000 | Pettit | 429/26 |
| 6,080,500 A | 6/2000 | Fuju et al. | |
| 6,183,895 B1 | 2/2001 | Kudo et al. | |
| 6,221,117 B1 * | 4/2001 | Edlund et al. | 48/76 |
| 6,257,868 B1 * | 7/2001 | Durst et al. | 431/7 |
| 6,294,685 B1 * | 9/2001 | Ushikubo et al. | 558/319 |
| 6,415,775 B1 | 7/2002 | Lahti et al. | |
| 6,521,204 B1 | 2/2003 | Borup et al. | |
| 6,759,016 B2 | 7/2004 | Sederquist et al. | |
| 6,783,742 B2 | 8/2004 | Bentley et al. | |
| 2002/0015870 A1 | 2/2002 | Cownden et al. | |
| 2002/0083646 A1 | 7/2002 | Deshpande et al. | |
| 2002/0088740 A1 | 7/2002 | Krause et al. | |
| 2002/0090326 A1 | 7/2002 | Deshpande | |
| 2002/0090327 A1 | 7/2002 | Deshpande | |
| 2002/0090328 A1 | 7/2002 | Deshpande | |
| 2002/0094310 A1 | 7/2002 | Krause et al. | |
| 2002/0108309 A1 | 8/2002 | Grieve | |
| 2002/0119354 A1 | 8/2002 | O'Brien et al. | |
| 2002/0155329 A1 | 10/2002 | Stevens | |
| 2002/0197195 A1 | 12/2002 | Epp | |
| 2003/0019156 A1 | 1/2003 | Takimoto et al. | |
| 2003/0021741 A1 | 1/2003 | Childress et al. | |
| 2003/0021742 A1 | 1/2003 | Krause et al. | |
| 2003/0022950 A1 | 1/2003 | Keppeler | |
| 2003/0044663 A1 | 3/2003 | Ballantine et al. | |
| 2004/0197718 A1 * | 10/2004 | Deshpande et al. | 431/2 |

FOREIGN PATENT DOCUMENTS

| | | |
|---|---|---|
| EP | 1 055 638 A2 | 11/2000 |
| WO | WO 01/59861 A2 | 8/2001 |
| WO | WO 02/00547 A1 | 1/2002 |

* cited by examiner

ANODE TAILGAS OXIDIZER

The present invention is a divisional application of U.S. Ser. No. 10/407,290, filed Apr. 4, 2003, the complete disclosure of which is incorporated herein by reference.

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is generally proportional to the consumption rate of the reactants.

A significant disadvantage which inhibits the wider use of fuel cells is the lack of a widespread hydrogen infrastructure. Hydrogen has a relatively low volumetric efficiency and is more difficult to store and transport than hydrocarbon fuels currently used in most power generation systems. One way to overcome this difficulty is the use of reformers to convert hydrocarbons to a hydrogen-rich gas stream that can be stored or used locally as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), non-catalytic partial oxidation (POX) or a combination thereof. The clean-up processes usually comprise a combination of desulphurization, high temperature water-gas shift, low temperature water-gas shift, selective CO oxidation, or selective CO methanation. Alternative processes include hydrogen selective membrane reactors and filters.

Despite the above work, there remains a need for a simplified fuel processing system for converting a hydrocarbon fuel to a hydrogen rich gas stream for use with a fuel cell. A practical obstacle facing any solution to this problem is the need to rapidly start-up the reforming reactor and the various combustion catalyst beds that may be used in the reforming process. Where autothermal reforming is desired, there is also the need to rapidly pre-heat the reforming reactants to their autothermal temperature(s) and to maintain those temperatures throughout the reforming process. Similarly, where steam reforming is used, the rapid and reliable generation of steam is also required.

The present invention addresses the need for a fuel reformer capable of rapid start-up and maintaining a more stable temperature profile during the operation of the reformer and that is capable of operating on low pressure fuel feeds.

SUMMARY OF THE INVENTION

The present invention provides a combustor for oxidizing a combustion fuel and pre-heating one or more reactants for fuel reforming. The apparatus comprises an elongated housing having an inlet for receiving a combustion fuel and an outlet for exhausting combustion products. Preferably the elongated housing further includes a cylindrical side wall, a bottom wall, and a top wall. Inert particles are disposed within the housing adjacent the inlet. The inert particles preferably comprise alumina spheres. A combustion catalyst bed is disposed within the housing above the inert particles. The combustion catalyst bed preferably includes inert particles mixed with the combustion catalyst. The inert particles and the combustion catalyst preferably have a volumetric ratio of inert particles to catalyst between about 2:1 and about 4:1 and more preferably between about 2.5:1 and about 3.5:1. The combustor includes at least one heat exchanging element disposed within the combustion catalyst bed that has an inlet for receiving a reformer reactant and an outlet for directing a heated reactant out of the elongated housing for use in fuel reforming. The heat exchanging element can include coiled tubing. Preferably, the combustor includes at least two heat exchanging elements disposed within the combustion catalyst bed. Where two or more heat exchanging elements are present it is preferred that at least two of the heat exchanging elements have different surface areas.

The combustor can include at least one sensor for measuring temperature within the combustor, and preferably the reactor includes two or more sensors for measuring temperature at two or more locations within the combustion catalyst bed. The sensor(s) can comprise a thermocouple connected to the top wall of the combustor. Optionally, a mixer can be located at the inlet for mixing the gases to be combusted. When present, the mixer is preferably a static in-line mixer connected to the inlet. Optionally, heating means for heating the combustion fuel and/or oxygen-containing gas can be provided. When present, the heating means preferably comprise an electrical heating element disposed below the combustion catalyst bed.

In a process aspect of the present invention, a method for pre-heating a reactant and generating steam for use in a fuel reformer is provided. The method comprises the step of combusting a gaseous fuel and an oxygen-containing gas in a combustion catalyst bed to generate heated combustion products. Optionally, the gaseous fuel and/or oxygen-containing gas can be pre-heated prior to combustion. In addition, the gaseous fuel and oxygen-containing gas can be mixed prior to combustion. When utilized, the step of mixing the gaseous fuel and oxygen-containing gas can include passing the fuel and oxygen-containing gas through a bed of inert particles, through a static in-line mixer or a combination thereof. Further, a fuel cell anode and/or cathode exhaust can be combusted with the gaseous fuel and oxygen-containing gas. Further still, temperatures at a plurality of locations within the combustion catalyst bed can be measured with a plurality of temperature sensors. Preferably, the combustion of the combustion fuel and oxygen-containing gas is controlled based at least in part in response to an average of the measured temperatures in the combustion catalyst bed.

The method further includes the step of exchanging heat between the heated combustion products and a reformer reactant across a heat exchange surface disposed within the combustion catalyst bed to generate a heated reformer reactant. The reformer reactant is preferably selected from a hydrocarbon fuel in the form of a gas, an oxygen-containing gas or a mixture thereof. Preferably, the step of exchanging heat between the heated combustion products and the reformer reactant across a heat exchange surface includes the step of directing a flow of the reformer reactant through a first heat exchanging element disposed at least in part within the combustion catalyst bed.

The method further includes the step of exchanging heat between the heated combustion products and liquid water across a heat exchange surface disposed at least in part within the combustion catalyst bed to generate steam. Preferably, the step of exchanging heat between the heated combustion products and the liquid water across a heat exchange surface includes the step of directing liquid water through the first heat exchanging element. Liquid water adheres to an inner surface of the first exchanging element. The flow of the reformer reactant through the first heat exchanging element promoting the evaporation of liquid water from the inner surface of the first heat exchanging element. Optionally, the step of exchanging heat between the heated combustion products and liquid water across a heat exchange surface includes the step of directing the liquid water through a second heat exchanging element disposed in the combustion catalyst bed. Optionally, the method can further include the steps of exchanging heat between the heated combustion products and a heating medium to generate a heated medium and recovering the heat of the heated medium for a non-fuel reforming application.

In a second process aspect of the present invention, a method for manufacturing a combustor for oxidizing a combustion fuel and pre-heating one or more reactants for use in fuel reforming is provided. The method comprising the steps of providing an elongated housing having an inlet in a lower portion of the housing and a combustion products exhaust outlet in an upper portion of the housing. The method further includes disposing within the housing at least one heat exchanging element having an inlet for receiving a reformer reactant and an outlet for directing heated reformer reactant out of the elongated housing. The method further includes the steps of loading inert particles into a lower portion of the housing adjacent the inlet and loading a mixture of a combustion catalyst and inert particles into the housing above the inert particles, the mixture having a volumetric ratio of inert particles to combustion catalyst of between about 2:1 and about 4:1.

The present invention further provides a power-generating apparatus. The power generating apparatus includes a combustor for pre-heating one or more reformer reactants and generating steam. The combustor has an elongated housing having an inlet for receiving a combustion fuel, an outlet for exhausting combustion gases, inert particles disposed within the housing adjacent the inlet, a combustion catalyst bed disposed within the housing above the inert particles, and at least one heat exchanging element disposed at least in part within the combustion catalyst bed. The combustor heat exchanging element has an inlet for receiving a reformer reactant and an outlet in fluid communication with a fuel processor. The fuel processor receives the heated reformer reactant(s) and converts the heated reformer reactant(s) to a hydrogen-rich reformate. The fuel processor is in fluid communication with a fuel cell for delivering the hydrogen-rich reformate to the fuel cell. The hydrogen-rich reformate is consumed within the fuel cell in an electrochemical reaction to generate electrical power.

BRIEF DESCRIPTION OF THE DRAWINGS

The invention may be understood by reference to the following description taken in conjunction with the accompanying drawings.

Figure 1:
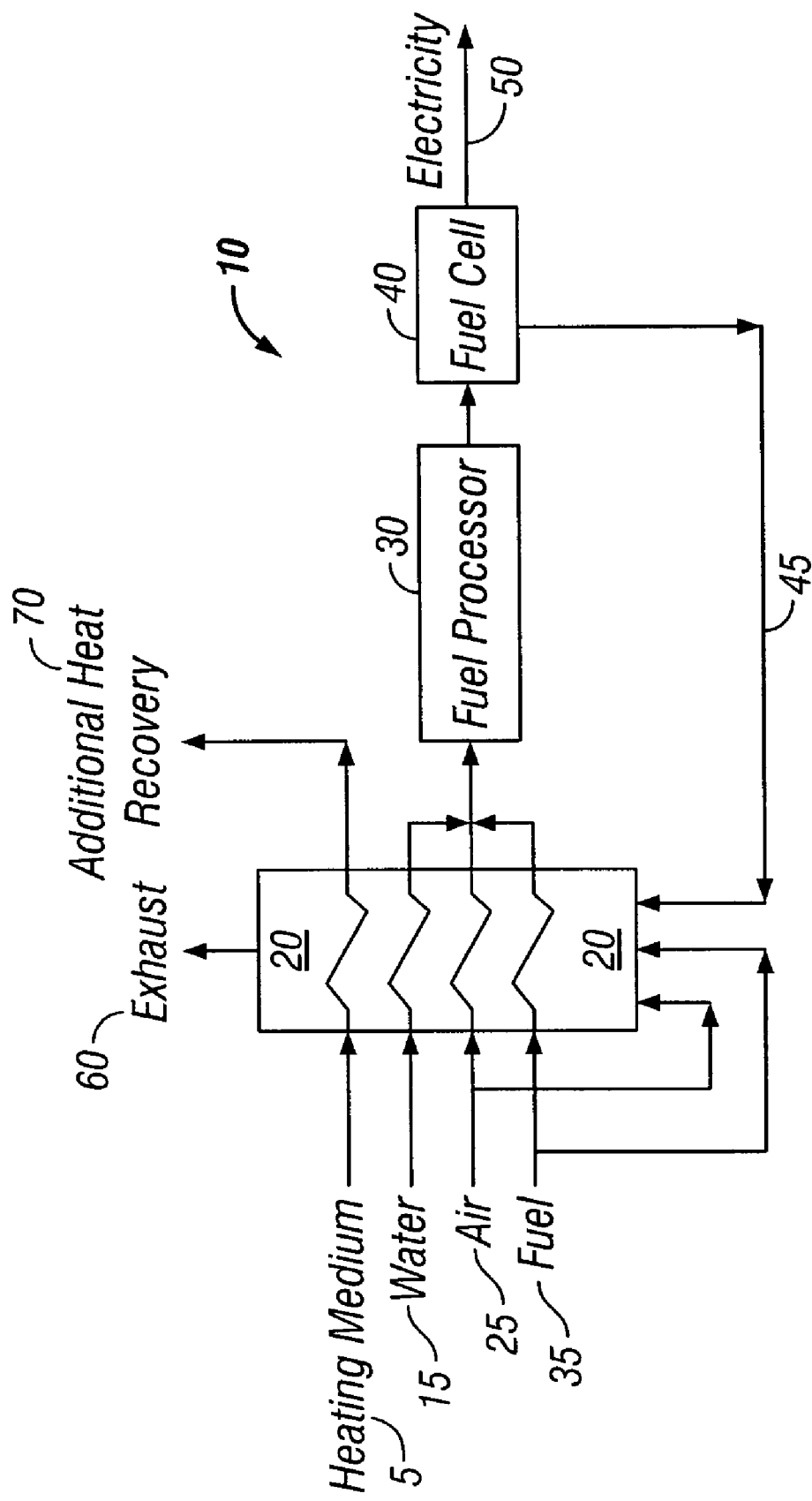
FIG. 1 is a block diagram illustrating the present invention and the integration of an anode tail gas oxidizer with a fuel processor and fuel cell stack.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

The present invention provides (1) a combustor for oxidizing a combustion fuel and pre-heating one or more reactants for fuel reforming; (2) a method for pre-heating a reactant and generating steam for use in a fuel reformer; (3) a method for manufacturing a combustor for oxidizing a combustion fuel and pre-heating one or more reactants for use in fuel-reforming; and (4) a power generating apparatus.

1) Combustor for Oxidizing a Combustion Fuel and Pre-Heating One or More Reactants for Fuel Reforming A combustor of the present invention has a number of functions including the generation of heat to pre-heat reformer reactants, the generation of steam for use in the reforming reaction, and the disposal through oxidation of various fuel cell exhaust gases and reformate that is not of fuel cell quality. The pre-heating of reformer reactants is particularly desirable where autothermal reforming is intended because the operating temperature of such reformers can range from about 550° C. to about 900° C., depending on the feed conditions and the catalyst. A combustor of the present invention will comprise an elongated housing, optional mixer and/or heating means, inert particles disposed within a lower portion of the housing, a combustion catalyst bed disposed above the inert particles and a heat exchanging element disposed at least in part within the combustion catalyst bed.

Elongated housings useful in the apparatus of the present invention will have a long axis and a cross sectional axis generally perpendicular to the long axis. The long and cross sectional axes of the housing will have a ratio of the long axis to the cross sectional axis of between about 1.25:1 and about 2.5:1. Preferably, the long axis of the combustor will be greater than about 7.5 inches, more preferably greater than about 11 inches, and still more preferably greater than about 15 inches. Preferably, the cross sectional axis of the housing is less than about 15 inches, and more preferably less than about 13 inches. More preferably still, the elongated housing has a cylindrical side wall, a bottom wall and a top wall.

An elongated housing suitable for use in the methods and apparatus of the present invention can be fabricated from any material capable of withstanding the operating conditions described herein and can include, for example, stainless steel, Inconel, Incoloy, Hastelloy, and the like. The reaction pressure is preferable from about 0 to about 100 psig, although higher pressures may be employed. The operating pressure of the combustor depends upon the operating conditions of the fuel processor/reformer and ultimately, the delivery pressure of the hydrogen-rich reformate required by the fuel cell. For fuel cells operating in the 1 to 20 kW range an operating pressure of 0 to about 100 psig is generally sufficient.

The elongated housing has an inlet located in a lower portion of the housing for receiving and directing combustion reactants into the housing. Combustion reactants include a gaseous fuel and an oxygen-containing gas. The oxygen-containing gas can be in the form of air, enriched air, or substantially pure oxygen. The hydrocarbon fuel is preferably in the gas phase at ambient conditions, but may be liquid provided that it can be easily vaporized. As used herein, the term "hydrocarbon" includes organic compounds having C—H bonds that are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include (but are not limited to) not only such fuels as natural gas, methane, ethane, propane, butane, naphtha, gasoline diesel and mixtures thereof, as well as alcohols such as methanol, ethanol, propanol, the like and mixtures thereof.

Preferably, the hydrocarbon combustion fuel is natural gas. Furthermore, the preferred hydrocarbon combustion fuel is natural gas at low pressure such as is available in most commercial and residential buildings. Typically, natural gas provided by a utility provider is at low pressure typically as low as about 2 psig. Therefore, the combustor and fuel reformer must be able to reliably operate on such low pressure fuels and pressure losses and pressure drops created within the fuel processing system become more critical. In particular, pre-heating of the fuel should not incur a substantial pressure drop as it passes through the combustor and the internal heat exchanger. Similarly, any pressure drop between the fuel cell exhaust exiting the fuel cell stack and the combustion products exiting the combustor should likewise be minimized.

Combustion reactants can also include fuel cell exhaust in the form of anode and/or cathode exhaust streams. Fuel cell exhaust typically contains a number of constituents such as unreacted hydrogen, unreacted oxygen-containing gases, spent reformate, spent oxygen-containing gases, steam and others components that must be eliminated and should not be vented to the atmosphere. In addition, off-specification hydrogen-rich reformate that is not of fuel cell quality can also be present as a combustion reactant. A side-stream can be provided at a point upstream from a fuel cell stack for directing off-specification reformate to the elongated housing inlet for combustion as well.

Inert particles are disposed within the lower portion of the housing adjacent the inlet. The inert particles are porous and heat resistant and serve to mix the in-coming combustion reactants and to transfer heat to such reactants. Suitable inert materials include metals, ceramics, sintered materials and the like. Refractory materials such as alumina are preferred. The form of the inert particles can be flowable particulates and agglomerated particulates having a variety of shapes.

Further, the inert particles need not be uniform in size. In a preferred embodiment, a portion of particles having a larger size are disposed immediately adjacent the housing inlet to provide improved mixing of combustion reactants as they enter the elongated housing. A portion of particles having a smaller size are disposed above the larger sized particles to provide additional mixing but to provide improved heat transfer to the combustion reactants as they approach the combustion catalyst bed. Preferably, the smaller dimensioned particles will have an average particle size of less than about 75%, preferably less than about 65%, and more preferably still, less than about 55% of the average particle size of the larger dimensioned particles.

Improvements in heat transfer due to the use of smaller dimensioned particles are believed to be due to the close packing and increased surface area of the smaller dimensioned particles. Thus, while smaller particle sizes are preferred for increasing heat transfer, those skilled in the art will recognize that the smaller sizes will also inhibit the flow rate of the combustion reactants through the housing, and thus, a balance between heat transfer and flow rate (losses in heat generation and pressure) must be achieved. In a preferred embodiment, the portion of larger sized inert particles comprise spherical alumina particles having a distribution about 0.25 inches and the portion of smaller sized particles have a distribution of about 0.125 inches.

The inert particles should fill a minor portion of the elongated housing's volume. More specifically, the inert particles disposed in the lower portion of the housing should fill less than about 35%, preferably less than 30%, and still more preferably less than 25% of the volume of the housing. In this case, volume is determined without accounting for open volume within the pores of the inert particles themselves.

Optionally, but preferably, the combustor will have means for pre-heating the combustion reactants either prior to or as they enter the elongated housing. Different heating means are known in the art and are suitable for use within the combustion chamber, in-line or within a separate module upstream from the housing inlet. Preferably, the heating means is an electrical heating element such as an electrical heating coil disposed within the housing and connected to a side wall of the housing. The heating means should capable of reaching temperatures of at least about 300° C. during start-up. Once the temperatures within the combustion catalyst bed have reached an operational temperature, the heating means can be operated at a reduced temperature or taken off-line. Preferably, the heating element is disposed immediately below the combustion catalyst bed described below, or within a lower portion of the combustion catalyst bed. More preferably, the heating element is disposed immediately above the inert particles or within an upper portion of the inert particles.

Optionally, but preferably, the combustor can also have a mixer for intimately mixing the combustion reactants. Preferably, the mixer is a static in-line mixer having fixed internal baffles or other internal structures that disrupt the flow of gases through the mixer. The mixer is preferably, located immediately within or without the housing inlet. In the alternative, mixing means may be provided as a separate module upstream from the housing inlet for mixing the combustion reactants. In addition, it should be noted that the use of inert particles within the combustor adjacent the inlet contributes to the intimate mixing of gases entering the combustor.

Disposed within the elongated housing above the inert particles is a combustion catalyst bed. The combustion catalyst should be an oxidation-type catalyst such as are well known to those with skill in the art. Examples of suitable oxidation catalyst include noble metals such as platinum, palladium, rhodium, and/or ruthenium on an alumina wash coat on a monolith, extrudate, pellet or other support. Non-noble metals such as nickel or cobalt have also been used. Other wash coats such as titania, zirconia, silica, and magnesia have also been cited in the literature. Many additional materials such as lanthanum, cerium, and potassium have been cited in the literature as "promoters" that improve the performance of the oxidation catalyst. In the presence of such catalysts, the oxidation reaction occurs very quickly to the complete the conversion of oxygen added and produces heat.

In a preferred embodiment, the combustion catalyst fills a minor portion of the volume within the elongated housing. More specifically, such a combustion catalyst bed is disposed above the inert particles and fills less than about 35%, preferably less than about 30%, and still more preferably, less than about 25% of the volume of the elongated housing. When the combustion catalyst comprises only a minor portion of the elongated housing volume, it is preferred that the catalyst bed comprise a packed bed, but in alternative, a catalyst on a fixed support such a monolith is also suitable. Further, in such an embodiment, an additional portion of inert particles is disposed within the elongated housing above the combustion catalyst about the heat exchanging element to promote heat transfer across a surface of the heat exchanging element. In that the primary function of these additional inert particles is to promote heat transfer, smaller sized inert particles are preferred.

In another preferred embodiment, the combustion of the combustion reactants is designed to occur in close proximity to the heat exchanging element so as to reduce inefficiencies that may occur due to heat losses. In such an embodiment, the combustion catalyst bed fills a major portion of the volume within the elongated housing. More specifically, such a combustion catalyst bed is disposed above the inert particles and fills more than about 50%, preferably more than about 60%, and still more preferably, more than about 70% of the volume of the elongated housing. In such an embodiment, the combustion catalyst bed comprises a mixture of inert particles and combustion catalyst particles. The mixture of inert particles and combustion catalyst preferably has a volumetric ratio of inert to catalyst of between about 2:1 to about 4:1 and more preferably between about 2.5:1 and about 3.5:1.

The elongated housing further includes at least one heat exchanging element having an inlet for receiving a reformer reactant and an outlet for directing a heated reformer reactant out of the elongated housing. The reformer reactant may be a hydrocarbon fuel as described above, an oxygen-containing gas, water, or a mixture thereof. At least a portion of the heat exchanging element is disposed within the combustion catalyst bed. The heat exchanging element is preferably coiled tubing or a plate-type heat exchanger as are known in the art. Coiled tubing of various diameters and lengths may be used. Where the pressure drop across the heat exchanging element is of concern, larger diameter and/or shorter length tubing should be used. Where greater heat transfer is needed longer lengths and narrower diameter tubing can be used. In addition, two or more sections of coiled tubing may be used where increased heat transfer is required. In such an embodiment, it is preferred that the coils be arranged concentrically to provide a more compact configuration. Fins and other structural elements can be added to the tubing to increase the heat exchange surface, but such structures typically disrupt the flow of fluids through and/or over the heat exchanging surface resulting in a drop in pressure.

Preferably, two or more reformer reactants are pre-heated in separate heat exchange elements such that the elongated housing comprises two or more, a plurality, of heat exchanging elements. Depending on the nature of the reformer reactant(s) and the amount of heating required, the heat exchange elements can have different dimensions and configurations, and thus, different heat exchange surface areas appropriate for the particular reformer reactant.

In a preferred embodiment for fuel processing applications comprising steam reforming, the hydrocarbon fuel and oxygen-containing gas are pre-heated in one or more heat exchanging elements while water is converted to steam within a separate heat exchanging element. In such an embodiment is it envisioned that the conversion of liquid water to steam will require a greater transfer of heat and thus a heat exchanging element with a larger heat exchanging surface area. More preferably, the hydrocarbon fuel and oxygen-containing gases in such an embodiment are pre-heated within a section of coiled tubing having an outer diameter greater than about 0.5 inches and preferably about 0.75 inches and a length of less than about 5 meters. The liquid water is converted to steam within a second section of coiled tubing having an outer diameter of less than about 0.5 inches and preferably about 0.25 inches and a length of at least about 6 meters. Such an arrangement is particularly preferred where a low pressure hydrocarbon fuel is used or in any system where pressure losses are of concern. Specifically, where the hydrocarbon fuel is at low pressure, such as in the case of a natural gas provided by a public utility, the natural gas and/or air are preheated separately from the generation of steam. The use of separate heat exchanging elements of different dimensions allows the optimization of heat transfer to the fuel and/or air gases and to liquid water for the generation of super heated steam.

In another preferred embodiment for fuel processing applications comprising steam reforming, the hydrocarbon fuel and oxygen-containing gas are pre-heated and the liquid water is converted to steam within a single common heat exchanging element. It is believed that as the liquid water is directed into a heat exchanging element, the liquid water adheres to and forms a thin film of liquid water along the inner surface of the heat exchanging element. While on this inner surface, liquid water absorbs heat from across the surface and is converted to steam. Further, the flow of the hydrocarbon fuel and oxygen-containing gas through the same heat exchanging element is believed to promote the evaporation of liquid water by spreading the water over a larger proportion of the inner surface area of the heat exchanging element, and further by carrying newly converted stream out of the heat exchanging element.

In addition, excess heat generated by the combustion reactants is lost if the combustion products are simply vented to the atmosphere. Different means for capturing such excess heat include directing the exhaust gases into an external heat exchanger. Alternatively, in another preferred embodiment, it is envisioned that an additional heat exchanging element will be disposed within the elongated housing for heating a heating medium. The heated medium can then be directed to a number of devices and applications external to the fuel processing operation where the heat may be recovered and utilized. A specific example includes directing the heated medium to a furnace or HVAC apparatus for use in controlling the temperature of residential and commercial buildings.

The heated combustion gases exchange heat with the reformer reactants across the surfaces of the heat exchanging elements. The reformer reactant(s) are heated as they pass through the coiled tubing. The heated reactants are then directed to the outlet(s) of the heat exchanging elements and out of the elongated housing. The inlets and outlets of the heat exchanging elements can be in a side wall of the housing but are preferably located in the top wall of the housing.

The elongated housing includes an outlet in the upper portion of the housing for exhausting combustion product gases from the housing. Preferably, the outlet is in the top wall of the housing. The outlet may be in fluid communication with the external environment for direct venting of the combustion product gases, or in the alternative, one or more systems and devices may be employed downstream from the outlet for recovering various components from the combustion product stream.

In addition, the combustors of the present invention comprise at least one sensor within the elongated housing for measuring temperature within the combustor. Preferably, two or more sensors will be used to measure temperatures within the elongated housing at different locations, and more specifically, at a plurality of locations within the combustion catalyst bed itself. Preferably, the temperature sensor will be a thermocouple. Thermocouples may be connected to a side wall of the elongated housing at different heights for this purpose. In a preferred embodiment, the temperature sensor will be connected to the top wall of the housing so as to simplify manufacture and assembly. In addition, where two or more sensors are desired, thermocouples having different length probes or adjustable length probes may be connected to the top wall of the housing for measuring temperature at different depths within the housing.

In a preferred embodiment where the operation of the combustor, and more specifically, the combustion of the hydrocarbon fuel and oxygen-containing gas is at least in part controlled based on the temperature of the combustion catalyst bed, the temperature of the combustion catalyst bed is monitored at a plurality of locations and an average temperature is calculated therefrom. It is believed that control of the combustion reaction at least in part in response to an average of the measured temperatures rather than in response to an individual temperature measurement leads to a more stable temperature profile within the combustor, and thus, a more uniform heating of the reformer reactant(s) and generation of steam.

(2) Method for Pre-Heating a Reactant and Generating Steam for Use in a Fuel Reformer The present invention further provides a method for pre-heating a reactant and generating steam for use in a fuel reformer is provided. The method comprises the step of combusting a gaseous fuel and an oxygen-containing gas in a combustion catalyst bed to generate heated combustion products. Anode and/or cathode exhaust can be combusted with the gaseous fuel and oxygen-containing gas.

Optionally, the gaseous fuel and/or oxygen-containing gas can be pre-heated prior to combustion. The pre-heating of these combustion reactants facilitates the combustion reaction. Pre-heating is preferably accomplished by an electrical heating element located immediately upstream from the combustion catalyst but can be accomplished by other heating means known in the art. During start-up, the heating element should be capable of quickly reaching temperatures greater than about 200° C., preferably greater than about 250° C., and more preferably greater than about 300° C., in order for the combustion of fuel and oxygen to begin. However, following start-up and during normal operation, the reaction between hydrogen-containing fuel and oxygen occurs at normal room temperature. At such times, the use of the heating element may not be necessary.

In addition, the gaseous fuel and oxygen-containing gas can be mixed prior to combustion. When utilized, the step of mixing the gaseous fuel and oxygen-containing gas can include passing the fuel and oxygen-containing gas through a bed of inert particles, through a static in-line mixer or a combination thereof. This mixing is preferably achieved with an in-line static mixer having baffles and/or fins for disrupting the flow of gases therethrough. Where other gases such as fuel cell exhaust gases are also to be combusted, these gases should be combined and mixed with the combustion fuel and oxygen-containing gas prior to entry into the combustion section. Those skilled in the art should recognize that other means for mixing the gaseous combustion reactants may be suitable.

The combustion of the fuel and oxygen-containing gas within the combustion catalyst bed generates heated combustion gases. It has been found that an operational temperature is achieved when the temperature within the combustion catalyst bed is sufficient to generate adequate steam and sufficiently pre-heat reformer reactants so as to promote an autothermal reforming reaction in the fuel reformer. This operational temperature was observed when the temperature in the combustion chamber reached at least about 500° C., preferably at least about 550° C. and more preferably at least about 600° C. Once an operational temperature has been achieved within the combustor catalyst bed, hydrocarbon fuel, oxygen-containing gas and water can be directed into one or more of the heat exchanging elements to generate steam and to heat the reformer reactant(s).

Temperature within the housing may be measured using a sensor located within the housing. In a preferred embodiment, a plurality of sensors is located at a plurality of locations within the housing. More preferably still, a plurality of sensors is used to measure temperatures at a plurality of locations within the combustion catalyst bed. Preferred temperature sensors include thermocouples that are mounted to a side wall of the housing or more preferably to a top wall of the housing. Where the thermocouples are used to measure temperature at different locations, top mounted thermocouples should have different or adjustable length probes so as to measure temperature at different depths within the housing.

In addition, the combustion reaction is typically controlled by measuring temperatures within the housing and making adjustments to flow rates of the various inputs. In a preferred embodiment, the combustion of the gaseous fuel and oxygen-containing gas is controlled at least in part in response to temperatures measured within the housing. More specifically, the combustion of the gaseous fuel and oxygen-containing gas is controlled at least in part in response to an average of a plurality of temperatures measured across the combustion catalyst bed.

The method further includes the step of exchanging heat between the heated combustion products and a reformer reactant across a heat exchange surface disposed within the combustion catalyst bed to generate a heated reformer reactant. The reformer reactant is preferably selected from a hydrocarbon fuel in the form of a gas, an oxygen-containing gas or a mixture thereof. Preferably, the step of exchanging heat between the heated combustion products and the reformer reactant across a heat exchange surface includes the step of directing a flow of the reformer reactant through a first heat exchanging element disposed within the combustion catalyst bed.

The method further includes the step of exchanging heat between the heated combustion products and liquid water across a heat exchange surface disposed in the combustion catalyst bed to generate steam. Preferably, the step of exchanging heat between the heated combustion products and the liquid water across a heat exchange surface includes the step of directing the liquid water through the first heat exchanging element. The liquid water tends to adhere to the inner surfaces of the first exchanging element. The flow of the reformer reactant through the first heat exchanging element promotes evaporation of liquid water from the inner surface of the first heat exchanging element.

Separate heat exchanging elements can be used for two or more reformer reactants. Further, different sized and configured heat exchanging elements may be preferred different reformer reactants depending on the nature and heating requirements for each. For instance, it is envisioned that streams of the hydrocarbon reformer fuel and oxygen-containing gas can be directed through the same heat exchanging element while water can be directed through a separate heat exchanging element having a greater amount of heat exchanging surface area for converting the water to steam. Thus, the step of exchanging heat between the heated combustion products and the water across a heat exchange surface optionally includes the step of directing the water through a second heat exchanging element disposed in the combustion catalyst bed.

Optionally, the method can further include the steps of exchanging heat between the heated combustion products and a heating medium to generate a heated medium and recovering the heat of the heated medium for a non-power generating application.

The heated reformer reactant(s) and steam generated within the heat exchanging element are then directed out of the heat exchanging element and the elongated housing into a fuel reformer where autothermal reforming may begin.

(3) Method for Manufacturing a Combustor for Oxidizing a Combustion Fuel and Pre-Heating One or More Reactants for Use in Fuel-Reforming In a second process aspect of the present invention, a method for manufacturing a combustor for oxidizing a combustion fuel and pre-heating one or more reactants for use in fuel reforming is provided. The method comprises the steps of providing an elongated housing having an inlet in a lower portion of the housing and a combustion products exhaust outlet in an upper portion of the housing. The method further includes the step of disposing within the housing at least one heat exchanging element having an inlet for receiving a reformer reactant and an outlet for directing a heated reformer reactant out of the elongated housing. The method further includes the steps of loading inert particles into a lower portion of the housing adjacent the inlet and loading a mixture of a combustion catalyst and inert particles into the housing above the inert particles. The mixture of inert particles and combustion catalyst has a volumetric ratio of inert particles to combustion catalyst of between about 2:1 and about 4:1.

(4) Power-Generating Apparatus

The present invention further provides a power-generating apparatus. The power generating apparatus includes a combustor for pre-heating one or more reformer reactants for use in a fuel processor. The fuel processor receives the heated reformer reactant(s) and converts the heated reformer reactant(s) to a hydrogen-rich reformate. The fuel processor is in fluid communication with a fuel cell for delivering the hydrogen-rich reformate to the fuel cell. The hydrogen-rich reformate is consumed within the fuel cell in an electrochemical reaction to generate electrical power.

Combustor

As described in detail above, a combustor of the present invention has an elongated housing having an inlet for receiving a combustion fuel, an outlet for exhausting combustion gases, inert particles disposed within the housing adjacent the inlet, a combustion catalyst bed disposed within the housing above the inert particles, and a heat exchanging element disposed at least in part within the combustion catalyst bed.

The description of the combustor of the present invention set forth above is fully incorporated here.

Fuel Processor

Two different reactions are typically carried out in a fuel reforming process. Formulas I and II are exemplary reaction formulas wherein methane is considered as the hydrocarbon fuel:

$$CH_4 + \tfrac{1}{2}O_2 \Rightarrow 2H_2 + CO \qquad (I)$$

$$CH_4 + H_2O \Rightarrow 3H_2 + CO \qquad (II)$$

The partial oxidation reaction (formula I) occurs very quickly to the complete conversion of oxygen added and is exothermic (i.e., produces heat). A higher concentration of oxygen in the feed stream favors the partial oxidation reaction.

The steam reforming reaction (formula II), occurs slower and is endothermic (i.e., consumes heat). A higher concentration of water vapor favors steam reforming.

One of skill in the art should understand and appreciate that partial oxidation and steam reforming may be combined to convert the pre-heated reformer reactant from the combustor into a synthesis gas containing hydrogen and carbon monoxide. In such instances, the ratios of oxygen to hydrocarbon and water to hydrocarbon become characterizing parameters. These ratios affect the operating temperature and hydrogen yield. The operating temperature of the reforming step can range from about 550° C. to about 900° C., depending on the feed conditions and the catalyst.

The reformer uses a combustion catalyst bed that may be in any form including pellets, spheres, extrudate, monoliths, and the like or wash coated onto the surface of fins or heat pipes. Partial oxidation catalysts should be well known to those with skill in the art and are often comprised of noble metals such as platinum, palladium, rhodium, and/or ruthenium on an alumina wash coat on a monolith, extrudate, pellet or other support. Non-noble metals such as nickel or cobalt have been used. Other wash coats such as titania, zirconia, silica, and magnesia have been cited in the literature. Many additional materials such as lanthanum, cerium, and potassium have been cited in the literature as "promoters" that improve the performance of the partial oxidation catalyst. Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

When the reforming process is primarily an autothermal reforming process, a cooling step for cooling the reformate stream to a temperature of from about 600° C. to about 200° C., preferably from about 500° C. to about 300° C., and more preferably from about 425° C. to about 375° C., to optimize the temperature of the reformate before clean-up processes. This cooling may be achieved with heat sinks, heat pipes or heat exchangers depending upon the design specifications and the need to recover/recycle the heat content of the gas stream. Alternatively, or in addition thereto, cooling may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art. When the reforming process is intended to be primarily a steam reforming process, cooling of the synthesis gas is optional because of the endothermic nature of the steam reforming process.

The combustor of the present invention will be integrated with a reformer or fuel processor as are known in the art for use in reforming or converting a hydrocarbon stream to a hydrogen-rich gas stream of fuel cell quality. Suitable reformers include but are not limited to those described in U.S. Patent Publication Nos.: US 2002/0083646 A1 to Deshpande, et al, published Jul. 4, 2002; US 2002/0090326 A1 to Deshpande, published Jul. 11, 2002; US 2002/0090328 A1 to Deshpande, published Jul. 11, 2002; US 2002/0090327 A1 to Deshpande, published Jul. 11, 2002; US 2002/0088740 A1 to Krause, et al., published Jul. 11, 2002; US 2002/0094310 A1, to Krause, et al., published Jul. 18, 2002; US 2002/0155329 A1 to Stevens, published Oct. 24, 2002; US 2003/00211741 A1 to Childress, et al., published Jan. 30, 2003; and US 2003/0021742 to Krause, et al., published Jan. 30, 2003, the disclosures of which are incorporated herein by reference. These publications disclose a number of differently configured reformers that may be used to advantage with the combustors of the present invention. However, it is preferred that the reformer integrated with the combustor of the present invention be a bottom-fed type reactor.

Post Reforming Clean-Up and Shift

One of the main impurities of the hydrocarbon stream is sulfur, which is converted by the reforming process to hydrogen sulfide. The reformer or a module downstream from the reformer can preferably include zinc oxide and/or other material capable of absorbing and converting hydrogen sulfide, and may include a support (e.g., monolith, extrudate, pellet etc.). Desulphurization is accomplished by converting the hydrogen sulfide to water in accordance with the following reaction formula III:

$$H_2S + ZnO \Rightarrow H_2O + ZnS \qquad (III)$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The reformate stream may then be sent to an optional mixing step in which water is added to the gas stream. The addition of water lowers the temperature of the reactant stream as it vaporizes and supplies more water for the water gas shift reaction. The water vapor and other reformate stream components can be mixed by being passed through a processing core of inert materials such as ceramic beads or other similar materials that effectively mix and/or assist in the vaporization of the water.

A typical water gas shift reaction converts carbon monoxide to carbon dioxide in accordance with formula IV:

$$H_2O + CO \Rightarrow H_2 + CO_2 \qquad (IV)$$

In this is process step, carbon monoxide, a poison to fuel cells, is substantially removed from the gas stream and is converted into carbon dioxide, which is generally considered an inert gas in fuel cells. The concentration of carbon monoxide should preferably be lowered to a level that can be tolerated by fuel cells, typically below about 50 ppm. Generally, the water gas shift reaction can take place at temperatures of from 150° C. to 600° C. depending on the catalyst used. Under such conditions, most of the carbon monoxide in the gas stream is oxidized to carbon dioxide.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like. High temperature shift catalysts are preferably operated at temperatures ranging from about 300° to about 600° C. and can include transition metal oxides such as ferric oxide or chromic oxide, and optionally including a promoter such as copper or iron silicide. Also included, as high temperature shift catalysts are supported noble metals such as supported platinum, palladium and/or other platinum group members. The shift catalyst can include a packed bed of high temperature or low temperature shift catalyst such as described above, or a combination of both high temperature and low temperature shift catalysts. Optionally, an element such as a heat pipe may be disposed in the processing core of the shift reactor to control the reaction temperature within the packed bed of catalyst as lower temperatures are favorable to the conversion of carbon monoxide to carbon dioxide.

In addition, selective oxidation can optionally be performed on the hydrogen-rich reformate to convert remaining carbon monoxide to carbon dioxide. Such reactions include: the desired oxidation of carbon monoxide (formula V) and the undesired oxidation of hydrogen (formula VI) as follows:

$$CO + \tfrac{1}{2}O_2 \Rightarrow CO_2 \qquad (V)$$

$$H_2 + \tfrac{1}{2}O_2 \Rightarrow H_2O \qquad (VI)$$

The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina wash coat. The wash coat may be applied to a monolith, extrudate, pellet or other support. Additional materials such as cerium or lanthanum may be added to improve performance. Many other formulations have been cited in the literature with some practitioners claiming superior performance from rhodium on alumina catalysts. Ruthenium, palladium, gold, and other materials have been cited in the literature as being active for this use as well.

The preferential oxidation of carbon monoxide is favored by low temperatures. Because both reactions produce heat, a heat pipe or other means can be disposed within the reactor to remove heat generated in the process. The operating temperature of process is preferably kept in the range of from about 90° C. to about 150° C. Again, such an oxidation process can be utilized to reduce the carbon monoxide level to less than 50 ppm, a level that is suitable for use in fuel cells.

The hydrogen-rich reformate exiting the fuel processor is a hydrogen rich gas containing carbon dioxide and other constituents such as water, inert components (e.g., nitrogen, argon), residual hydrocarbon, etc. This reformate can be used as the feed for a fuel cell or for other applications where a hydrogen-rich feed stream is desired. Optionally, product gas may be sent on to further processing, for example, to remove the carbon dioxide, water or other components.

Fuel Cell

A power generating apparatus of the present invention comprises at least one fuel cell for conducting an electrochemical reaction that produces electricity and an exhaust stream comprising water.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$H_2 \rightarrow 2H^+ + 2e^- \quad (1)$$

at the anode of the cell, and $$O_2 + 4H^+ + 4e^- \rightarrow 2H_2O \quad (2)$$

at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. The flow field plates are generally molded, stamped or machined from materials including carbon composites, plastics and metal alloys. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The GDLs generally comprise either a paper or cloth based on carbon fibers. The PEM and its adjacent pair of catalyst layers are often referred to as a membrane electrode assembly (MEA). An MEA sandwiched by adjacent GDL layers is often referred to as a membrane electrode unit (MEU), or also as an MEA. Common membrane materials include NAFION™, GORE SELECT™, sulphonated fluorocarbon polymers, and other materials such as polybenzimidazole (PBI) and polyether ether ketone. Various suitable catalyst formulations are also known in the art, and are generally platinum-based.

Preferably, the power generating apparatus will have a plurality of fuel cells connected in series as a fuel cell stack. Fuel cell stacks also typically employ one or more manifolds for connecting common feed streams to the individual cells and for connecting the multiple anode and cathode exhaust outlets to one or more common exhaust streams. In the power generation apparatus of the present invention, the fuel cell or fuel cell stack has at least one exhaust stream outlet for connecting with the exhaust stream inlet of a process water tank. The exhaust stream preferably comprises a cathode exhaust stream but may also comprise an anode exhaust stream.

In addition, the fuel cells and fuel cell stacks used in the power generating apparatus of the present invention can also have an inlet for receiving a stream of water or other cooling fluid for circulating through the stack and to control the temperature of the fuel cell during the electrochemical reaction.

Similarly, it is envisioned that the fuel cell stack can be housed within a common enclosure with the process water tank, with or without an associated fuel processing apparatus. Descriptions of suitable enclosures may be obtained by reference to U.S. Pat. No. 6,080,500 issued Jun. 27, 2000 to Fuju, et al.; U.S. Pat. No. 6,183,895 issued Feb. 6, 2001 to Kudo, et al.; International Patent Application Publication No. WO 01/59861, published Aug. 16, 2001; U.S. Patent Application Publication No. US 2002/0119354 A1, published Aug. 29, 2002; and U.S. Patent Application Publication No. US 2003/0044663 A1, published Mar. 6, 2003. The description of each of these references is incorporated herein by reference. A preferred enclosure is described in U.S. application Ser. No. 10/407,316 "Portable Fuel Processor Apparatus and Enclosure and Method of Installing Same," to Wheat, et al., filed Apr. 4, 2003 the disclosure of which is incorporated herein by reference.

DETAILED DESCRIPTION OF THE FIGURES

FIG. 1 is a schematic diagram of a power-generating apparatus of the present invention referred to generally at reference number 10. As shown, power-generating apparatus 10 comprises combustor 20 that receives a gaseous fuel from source 35, air from source 25 and a fuel cell exhaust 45 for combustion within the combustor. These combustion reactants are combusted or oxidized within a combustion catalyst bed (not shown in FIG. 1) to generate heated combustion products that pass through the combustor and are vented. One or more heat exchanging elements are disposed within combustor 20 for exchanging heat between the heated combustion products and fuel, air, water from a source 15 and a heating medium from a source 5. The air and fuel are pre-heated for use in fuel processor 30. As shown, the heated air and fuel are combined upstream from fuel processor 30. The water is converted to steam within a heat exchanging element for use in fuel processor 30. As shown, the heated air and fuel and steam are combined upstream from fuel processor 30. The heating medium is utilized to capture excess heat from the combustion reaction. The heated medium is directed out of combustor 20 for recovery in a separate heat recovery unit 70.

The heated reformer reactants and steam generated in combustor 20 are combined and directed to fuel processor 30 for conversion to a hydrogen-rich reformate. Although not illustrated in detail, fuel processor 30 includes a number of optional devices and processes that are used to remove contaminants and to concentrate the hydrogen-rich reformate. The hydrogen-rich reformate is them directed to fuel cell 40 where it is used in an electrochemical reaction to generate electrical power. Fuel cell exhaust in the form of anode and/or cathode exhaust streams are preferably routed to the inlet of combustor 20 for combustion. Anodic fuel cell exhaust can contain combustible gases, which when combusted in combustor 20 eliminates a hazardous by-product stream and improves the fuel efficiency of the combustion reaction. Similarly, directing inert gases that are a typically component of cathodic fuel cell exhaust can be used to further control the combustion reaction.

Figure 2B:
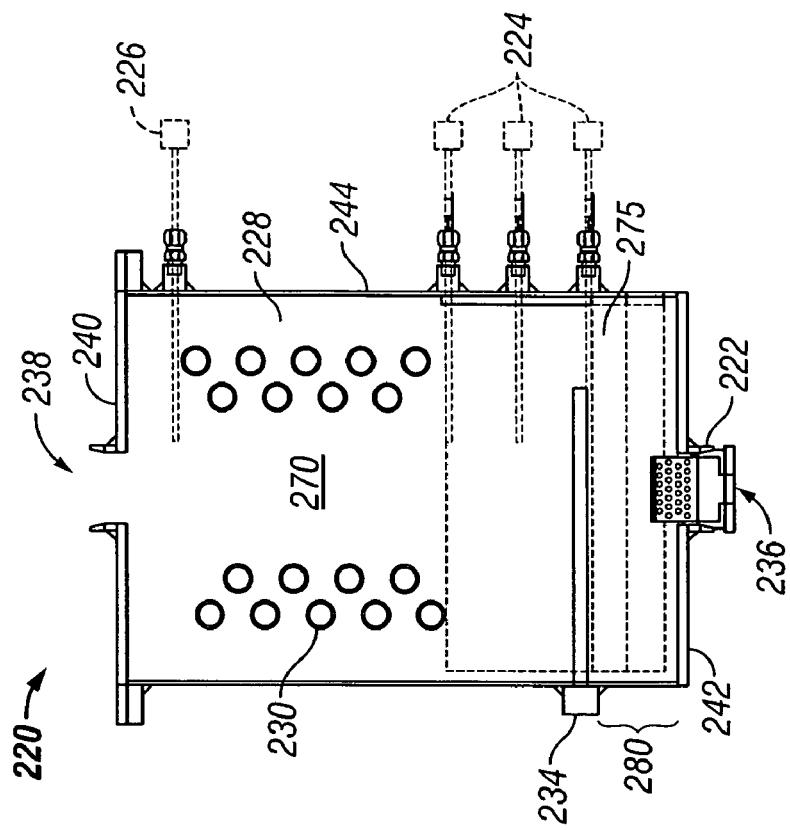
FIG. 2B is cross sectional view of an oxidizer apparatus of the present invention.
Figure 2A:
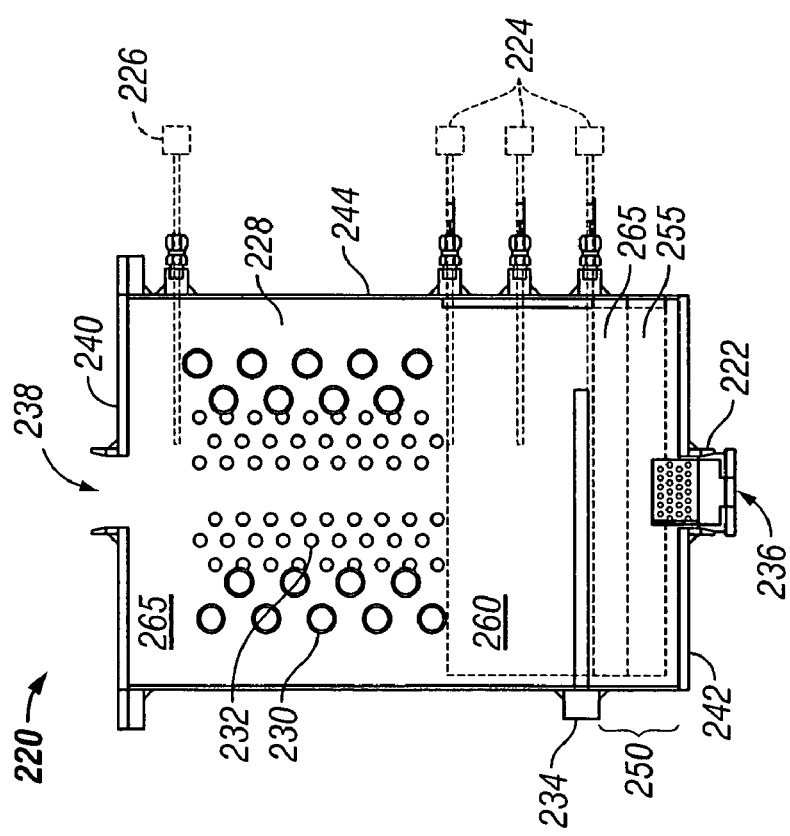
FIG. 2A is cross sectional view of an oxidizer apparatus of the present invention.

FIG. 2A is a cross sectional view of the combustor of the present invention. As illustrated, the combustor comprises elongated housing 220 having top wall 240, bottom wall 242 and side wall 244 enclosing space 228. Inlet 236 is provided on bottom wall 242 and combustion products outlet 238 is provided on top wall 240.

Static mixer 222 is located within inlet 236 for mixing combustion reactants entering the elongated housing. Electrical heating coil 234 is connected to side wall 244 such that the heating coil is disposed within the housing above inlet 236.

Inert particles 250 are disposed in the lower portion of housing 220. Specifically, inert particles 250 include a bed of larger dimensioned inert particles 255 disposed adjacent inlet 236 and a second bed of smaller dimensioned inert particles 265 disposed above bed 255.

Combustion catalyst bed 260 is disposed above the inert particles 250. Disposed at least in part within combustion catalyst bed 260 are heat exchanging elements 230 and 232. Heat exchanging elements 230 and 232 are coil tubing each having an inlet and an outlet that passes through side wall 244 (not shown). Heat exchanging element 230 has a larger diameter but fewer turns than heat exchanging element 232. Overall heat exchanging element 232 provides greater heat exchanging surface area than element 230. Liquid water is directed through heat exchanging element 232 for conversion to steam while reformer reactant(s) such as natural gas and air are directed through heat exchanging element 230. In the embodiment shown in FIG. 2A, an additional portion of inert particles 265 are packed around the heat exchanging elements 230 and 232 to enhance heat transfer between the heated combustion products and the reformer reactant(s) and water that are directed through the heat exchanging elements.

Temperatures within the combustor are measured with thermocouples 224 and 226. As shown, a plurality of thermocouples are located on side wall 244 so as to measure temperature within the combustion catalyst bed at a number of different locations or depths. In a preferred embodiment, thermocouples used to monitor temperatures within the housing will be mounted on top wall 240.

FIG. 2B is a cross sectional view of a similar embodiment of the combustor shown in FIG. 2A and the same features are referenced with the same reference numbers. In the embodiment shown in FIG. 2B, a bed of inert particles 275 is disposed in a lower portion 280 of the elongated housing 220. Combustion catalyst bed 270 comprises a mixture of combustion catalyst and inert particles and fills housing space 228 above the inert particles 275.

In addition, the combustor shown in FIG. 2b has a single heat exchanging element 230 for heating both a reformer reactant(s) such as reformer fuel and/or air and for generating steam. As described above, liquid water is more efficiently converted to steam when directed through a common heat exchanging element with the reformer fuel and/or air. The flow of one or more of these gases through the heat exchanging element spreads the water over a larger proportion of the heat exchanging surfaces. Further, as the liquid water is converted to steam it is immediately carried along with the flow of gases through the heat exchanging element.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. Combustor for oxidizing a combustion fuel and preheating one or more reactants for fuel reforming, the apparatus comprising:
   an elongated housing having an inlet for receiving a combustion fuel; and an outlet for exhausting combustion gases;
   optionally, a mixer located at the inlet;
   inert particles disposed within the housing adjacent the inlet with a first bed of inert particles being positioned to receive the combustion fuel from the inlet, the inert particles further comprising a second bed of inert particles which receives the combustion fuel after passing through the first bed, wherein the first bed is comprised of inert particles that are larger in size from the inert particles of the second bed;
   optionally, heating means for heating the combustion fuel;
   a combustion catalyst bed disposed within the housing to receive the combustion fuel after passing through the first and second beds of inert particles, wherein the combustion catalyst bed comprises catalyst particles mixed with inert particles in addition to the first and second layers of inert particles thereby defining mixed inert particles; and
   a heat exchanging element having an inlet for receiving a reformer reactant and an outlet for directing a heated reformer reactant out of the elongated housing for use in fuel reforming, at least a portion of the heat exchanging element disposed within the combustion catalyst bed.

2. The combustor of claim 1, wherein the elongated housing further comprises a cylindrical side wall, a bottom wall, and a top wall.

3. The combustor of claim 2, further comprising at least one sensor for measuring temperature within the combustor.

4. The combustor of claim 3, wherein the sensor is a thermocouple connected to the top wall of the combustor.

5. The combustor of claim 1, further comprising two or more sensors for measuring temperature at two or more locations within the combustion catalyst bed.

6. The combustor of claim 1, wherein the mixer is a static mixer connected to the inlet.

7. The combustor of claim 1, wherein the inert particles comprise alumina spheres.

8. The combustor of claim 1, wherein the heating means comprises an electrical heating element disposed below the combustion catalyst bed.

9. The combustor of claim 1, wherein the mixed inert particles and the combustion catalyst have a volumetric ratio of between about 2:1 and about 4:1.

10. The combustor of claim 1, wherein the volumetric ratio of mixed inert particles to combustion catalyst is between about 2.5:1 and about 3.5:1.

11. The combustor of claim 1, wherein the heat exchanging element comprises coiled tubing.

12. The combustor of claim 1, wherein there are at least two heat exchanging elements disposed within the combustion catalyst bed.

13. The combustor of claim 12, wherein at least two of the heat exchanging elements have different surface areas.

14. The combustor of claim 1, wherein:
    the first bed of inert particles comprises large inert particles and the second bed of inert particles comprises small inert particles;
    the small inert particles having an average particle size of less than about seventy-five percent of an average particle size of the large inert particles.

15. The combustor of claim 1, wherein:
the first bed of inert particles comprises large inert particles and the second bed of inert particles comprises small inert particles;
the small inert particles having an average particle size of less than about sixty-five percent of an average particle size of the large inert particles.

16. The combustor of claim 1, wherein:
the first bed of inert particles comprises large inert particles and the second bed of inert particles comprises small inert particles;
the small inert particles having an average particle size of less than about fifty-five percent of an average particle size of the large inert particles.

17. A method for manufacturing a combustor for oxidizing a combustion fuel and pre-heating one or more reactants for use in fuel reforming, the method comprising the steps of:
providing a cylindrical housing having an inlet in a lower portion of the housing and an combustion products exhaust outlet in an upper portion of the housing;
disposing within the housing at least one heat exchanging element, the heat exchanging element having an inlet for receiving a reformer reactant and an outlet for directing heated reformer reactant out of the heat exchanging element;
loading inert particles into the housing adjacent the inlet, wherein the inert particles comprise a first bed and a second bed, and wherein the first bed is comprised of inert particles that are larger in size from the inert particles of the second bed; and
loading a mixture of a combustion catalyst and inert particles into the housing above the inert particles, the mixture having a volumetric ratio of inert particles to combustion catalyst of between about 2:1 and about 4:1.

18. A power-generating apparatus comprising:
a combustor for pre-heating one or more reformer reactants, the combustor having an elongated housing having an inlet for receiving a combustion fuel; an outlet for exhausting combustion gases; optionally, a mixer located at the inlet; inert particles disposed within the housing adjacent the inlet with a first bed of inert particles being positioned to receive the combustion fuel from the inlet, the inert particles further comprising a second bed of inert particles which receives the combustion fuel after passing through the first bed, wherein the inert particles comprise a first bed and a second bed, and wherein the first bed is comprised of inert particles that are larger in size from the inert particles of the second bed; optionally, heating means for heating the combustion fuel; a combustion catalyst bed disposed within the housing to receive the combustion after passing through the first and second beds of the inert particles, wherein the combustion catalyst bed comprises catalyst particles mixed with inert particles in addition to the first and second layers of inert particles thereby defining mixed inert particles; and at least one heat exchanging element disposed within the combustion catalyst bed, said heat exchanging element having an inlet for receiving a reformer reactant and an outlet for directing a heated reactant out of the elongated housing for use in fuel reforming;
a fuel processor for converting the heated reformer reactants to a hydrogen-rich reformate; and
a fuel cell for consuming the hydrogen-rich reformate in an electrochemical reaction to generate electrical power.

* * * * *